(12) United States Patent
Gish et al.

(10) Patent No.: US 7,882,503 B2
(45) Date of Patent: Feb. 1, 2011

(54) PRODUCTION REDEPLOYMENT

(75) Inventors: James William Gish, Sudbury, MA (US); Chinnappa Ganapathy Codanda, Boston, MA (US); Brian Christopher Chesebro, Londonderry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1162 days.

(21) Appl. No.: 11/282,060

(22) Filed: Nov. 17, 2005

(65) Prior Publication Data

US 2007/0169102 A1 Jul. 19, 2007

(51) Int. Cl.
  *G06F 9/445* (2006.01)
(52) U.S. Cl. .................. 717/170; 717/169; 717/171; 717/175; 717/176; 717/177
(58) Field of Classification Search .............. None
  See application file for complete search history.

(56) References Cited

U.S. PATENT DOCUMENTS

| 5,410,703 | A * | 4/1995 | Nilsson et al. ............. 717/168 |
| 5,465,328 | A | 11/1995 | Dievendorff |
| 6,429,860 | B1 | 8/2002 | Hughes |
| 6,557,168 | B1 | 4/2003 | Czajkowski |
| 6,823,519 | B1 | 11/2004 | Baird |
| 7,080,145 | B2 * | 7/2006 | Srivastava et al. ........... 709/226 |
| 7,089,584 | B1 | 8/2006 | Sharma |
| 7,418,718 | B2 | 8/2008 | Liu et al. |
| 7,484,224 | B2 | 1/2009 | Potter et al. |
| 7,506,338 | B2 | 3/2009 | Alpern et al. |
| 7,506,342 | B2 * | 3/2009 | Mousseau et al. ........... 719/320 |
| 7,644,403 | B2 | 1/2010 | Atsatt |
| 2002/0147971 | A1 | 10/2002 | Adams |
| 2003/0061515 | A1 | 3/2003 | Kindberg |
| 2003/0093470 | A1 | 5/2003 | Upton |
| 2004/0015859 | A1 | 1/2004 | Potter et al. |
| 2004/0158819 | A1 | 8/2004 | Cuomo et al. |
| 2004/0187127 | A1 | 9/2004 | Gondi et al. |
| 2004/0255294 | A1 | 12/2004 | Spotwood |
| 2005/0003850 | A1 | 1/2005 | Tsuda et al. |
| 2005/0015425 | A1 | 1/2005 | Kumar |

(Continued)

OTHER PUBLICATIONS

Kniesel, G. et al., JMangler—A Framework for Load-Time Transformation of Java Class Files, IEEE, Aug. 6, 2002, 11 pages.

(Continued)

*Primary Examiner*—Chuck O Kendall
(74) *Attorney, Agent, or Firm*—Fliesler Meyer LLP

(57) ABSTRACT

In accordance with embodiments, there are provided mechanisms and methods for substituting a new version resource adaptor for a production version of the resource adaptor. These mechanisms and methods can enable embodiments to provide upgrade to a new version resource adaptor contemporaneous with completion of work by the production version of the resource adaptor. The ability of embodiments to provide upgrade to a new version resource adaptor contemporaneous with completion of work by the production version of the resource adaptor can enable an installation desiring to install a new component of their connector system while the system remains in production, eliminating the need to halt the system, i.e., stop all traffic, replace the production version of the component with an upgraded version, test and finally place the upgraded version into production.

17 Claims, 5 Drawing Sheets

U.S. PATENT DOCUMENTS

| | | |
|---|---|---|
| 2005/0187891 A1 | 8/2005 | Johnson |
| 2006/0112379 A1 | 5/2006 | Chirakansakcharoen et al. |
| 2006/0129983 A1 | 6/2006 | Feng |
| 2006/0224633 A1 | 10/2006 | Fahmy et al. |
| 2007/0061795 A1 | 3/2007 | Atsatt |
| 2007/0061796 A1 | 3/2007 | Atsatt |
| 2007/0061798 A1 | 3/2007 | Atsatt |
| 2010/0070960 A1 | 3/2010 | Atsatt |

OTHER PUBLICATIONS

Gong, L., Secure Java Class Loading, IEEE, Dec. 1998, pp. 56-61.

* cited by examiner

PRODUCTION REDEPLOYMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and Patent Applications, including the present application, are related to each other. Each of the other patents/applications are incorporated by reference herein in its entirety:

U.S. Patent Application Ser. No. 11/281,968 entitled RESOURCE ADAPTOR CLASSLOADING, by Codanda Ganapathy Chinnappa, et al., filed on Nov. 17, 2005;

U.S. patent application Ser. No. 11/281,831 entitled METHOD AND COMPUTERREADABLE MEDIUM FOR SUSPENDED STATE RESOURCE ADAPTER, by James William Gish, et al., filed on Nov. 17, 2005, issued Feb. 24, 2009, as U.S. Pat. No. 7,496,705; and U.S. patent application No. 11/416,906 entitled RECOVERY MECHANISM FOR TRANSACTIONS, by Brian Christopher Chesebro, et al., filed on May 3, 2006.

FIELD OF THE INVENTION

The current invention relates generally to techniques for providing interconnectivity between one or more application servers and one or more enterprise information systems, and more particularly to a mechanism for substituting a new version resource adaptor for a production version of the resource adaptor.

BACKGROUND

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

However, since applications, as well as the Enterprise Information Systems (EIS) to which the applications connect, may be provided by many different vendors, a mechanism that enables these disparate computational entities to communicate with one another was needed. The Java 2 Platform Enterprise Edition (J2EE) is a specification that addresses such needs.

J2EE Connector Architecture provides a mechanism for integrating J2EE-compliant application servers with enterprise information systems. The J2EE Connector Architecture defines a Common Client Interface (CCI) for EIS access. The CCI defines a client API that enables clients to interact with heterogeneous enterprise information systems. Application servers, i.e., servers onto which applications may be deployed, Enterprise Information Systems need only follow a J2EE Connector Architecture specification in order to interconnect with one another.

Unfortunately, the J2EE specification does not resolve all interconnection issues. For example, the J2EE connector architecture leaves responsibility for component upgrades to each application server vendor. For example, an installation desiring to install a new component of their connector system is presently required to halt the system, i.e., quiesce all traffic, replace the production version of the component with an upgraded version, test and finally place the upgraded version into production. Such procedures often require users to wait for the system to come back up.

What is needed is an improved mechanism for substituting a new version of a connector component for a production version of the connector component.

DETAILED DESCRIPTION

Figure 1:
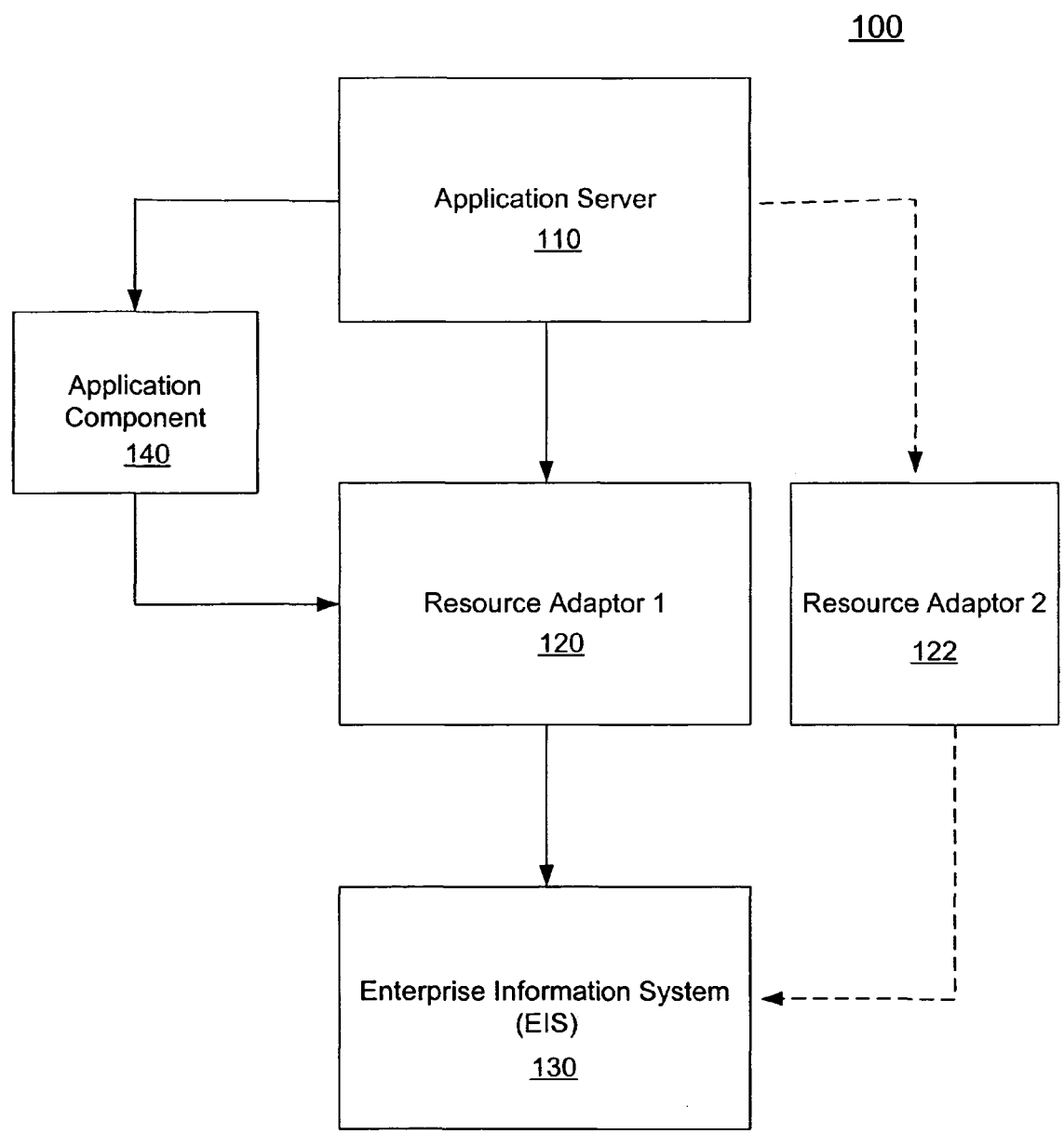
FIG. 1 is functional block diagram of an example computing environment in which techniques for substituting a new version resource adaptor for a production version of the resource adaptor in an embodiment may be implemented.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for substituting a new version resource adaptor for a production version of the resource adaptor. These mechanisms and methods can enable embodiments to provide upgrade to a new version resource adaptor contemporaneous with completion of work by the production version of the resource adaptor. The ability of embodiments to upgrade to a new version resource adaptor contemporaneous with completion of work by the production version of the resource adaptor can enable an installation desiring to install a new component of their connector system with the capability to install the new component while the system remains in production. Such capabilities can eliminate the need to halt the system, i.e., wait for all traffic to stop, replace the production version of the component with an upgraded version, test and finally place the upgraded version into production. For users, this means that down time waiting for the system to come back up can be reduced or even eliminated.

While the present invention is described with reference to an embodiment in which techniques for substituting a new version resource adaptor for a production version of the resource adaptor are implemented in conformance with the J2EE Connector Architecture using executable programs written in the Java™ programming language, the present invention is not limited to the J2EE Connector Architecture nor the Java™ programming language. Embodiments may be practiced using other interconnectivity specifications or programming languages, i.e., JSP and the like without departing from the scope of the embodiments claimed. (Java™ is a trademark of Sun Microsystems, Inc.)

FIG. 1 is functional block diagram of an example computing environment implementing a connector architecture in which techniques for substituting a new version resource adaptor for a production version of the resource adaptor in an embodiment may be implemented. As shown in FIG. 1, a connector architecture implementation 100 includes application server 110, resource adaptor 120, enterprise information system (EIS) 130, and application component 140. As used herein, the term Enterprise Information System (EIS) is defined broadly to include any computing installation that provides the information infrastructure for an enterprise. As used herein, the term application server is defined broadly as a server computer in a computer network dedicated to running certain software applications. In a multi-tier architecture, an application server sits beside a web server or between a web server and enterprise information systems to provide the middleware for enterprise systems. As used herein, the term resource adapter is defined broadly to include any segment of code that represents an Enterprise Information System (EIS). As used herein, the term application component is defined broadly as any data entry, update, query or program that processes data on behalf of a user. Users may be human or computational entities, including proxies and the like.

In one embodiment, the connector architecture implementation 100 is compatible with the Java 2 Enterprise Edition (J2EE) Connector Architecture. This architecture provides for an EIS vendor-provided resource adaptor and an application server, to which the resource adaptor plugs in. The J2EE Connector Architecture defines a set of contracts, such as transactions, security, and connection management, which both the resource adaptor and application server require to communicate with one another. The connector architecture 100 may be implemented in an application server and an EIS-specific resource adaptor. Systems implement Connector Architecture to enable multiple applications to attempt to establish connections with the EIS.

Application server 110 embodiments can be configured from a variety of hardware and software products. The application server 110 may run Java or other programming language environment, and may be configured to provide access to resources internal to the server, as well as resources reachable by the application server 110. Resources can include applications, services, databases web sites and other computer based resources. In one embodiment, the application server 110 utilizes WebLogic® Server from BEA systems of San Jose, Calif.

Resource adaptor 120 comprises a system level software driver used by application server 110 to connect to EIS 130. In an embodiment, resource adaptor 120 contains Java code and any native components required to facilitate interconnection between the application server 110 and the EIS 130. In one embodiment, the connector architecture 100 supports resource adaptors developed by EIS vendors and third party application developers that can be deployed in any application server according to the J2EE platform specification.

The EIS 130 provides the information infrastructure for an enterprise. In various embodiments, EIS 130 may provide one or more applications, programs or processes capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. The services may be exposed to clients as local or remote interfaces, or both.

Application component 140 may be at least a subset of an application, and can be implemented for example and without limitation, using an enterprise java bean (EJB), Java Server Page (JSP), servlet, or any combination thereof, that is deployed, managed, or executed on the application server 110.

The connector architecture 100 of FIG. 1 further includes system level contracts. System level contracts govern the interactions between the resource adaptor 120 and the application server 110. The contracts may relate to connection management or other aspects of the connector architecture. Connection management contracts allow an application server the ability to provide a pool of connections to underlying EISs that enable application components to connect to an EIS. In one embodiment of the present invention, the connection management relates to connection pool configuration, connection pool management, and connection management.

Open, i.e., established, connections may be managed in a connection pool that holds all available connections to an EIS. Sometimes, after many machines have established connections to and are using the services of an EIS, an installation will need to change the resource adaptor linking to an EIS. Embodiments of the present invention enable substituting a new version resource adaptor for a production version of the resource adaptor by indicating that the new version resource adaptor is to replace the production version resource adaptor to the production version resource adaptor and the new version resource adaptor. The new version resource adaptor and the production version resource adaptor are free to complete processing to facilitate the substitution, i.e., shutdown processing, startup processing, etc. Traffic received after receiving an indication from the production version of the resource adaptor that replacement is complete is directed to the new version resource adaptor. Messages received prior to receiving an indication from the production version of the resource adaptor that replacement is complete are routed to the production version resource adaptor. The foregoing described mechanism can enable upgrade to a new version resource adaptor contemporaneous with completion of work by the production version of the resource adaptor.

Figure 2A:
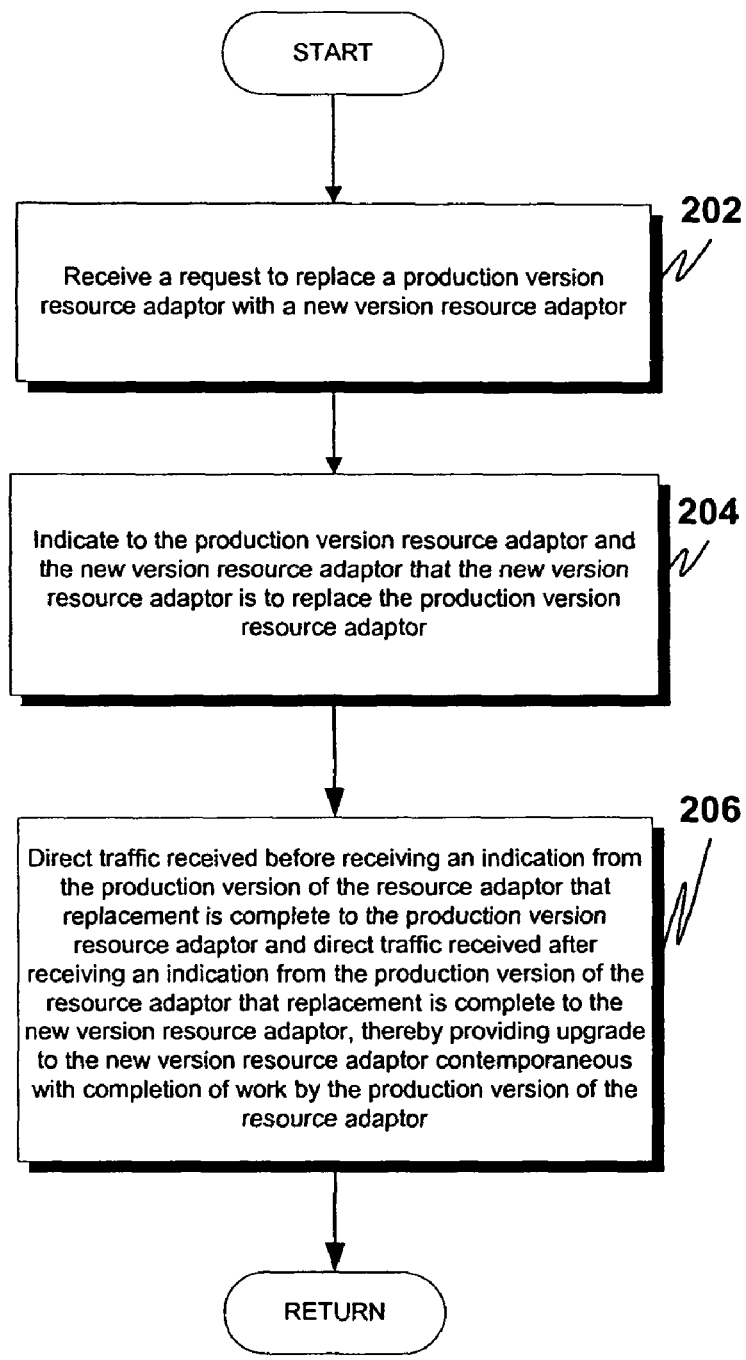
FIG. 2A is an operational flow diagram illustrating a high level overview of a technique for substituting a new version resource adaptor for a production version of the resource adaptor in an embodiment.

FIG. 2A is an operational flow diagram illustrating a high level overview of a technique for substituting a new version resource adaptor for a production version of the resource adaptor in an embodiment. The technique for substituting a new version resource adaptor for a production version of the resource adaptor shown in FIG. 2A is operable with an application server, application component and resource adaptor, such as application server 110, application component 140 and resource adaptor 120 of FIG. 1, for example. As shown in FIG. 2A, a request to replace the production version resource adaptor with the new version resource adaptor is received (block 202). An indication that the new version resource adaptor is to replace the production version resource adaptor is made to the production version resource adaptor and the new version resource adaptor (block 204). Traffic received after receiving an indication from the production version of the resource adaptor that replacement is complete is directed to the new version resource adaptor (block 206). The foregoing method steps can enable the production version resource adaptor and the new version resource adaptor to perform substitution of the new version resource adaptor for the production version of the resource adaptor independent of processing external to either of the production version resource adaptor and the new version resource adaptor. Further, the foregoing method steps can enable embodiments to provide upgrade to a new version resource adaptor contemporaneous with completion of work by the production version of the resource adaptor. The ability of embodiments to provide upgrade to a new version resource adaptor contemporaneous with completion of work by the production version of the resource adaptor can enable an installation desiring to install a new component of their connector system while the system remains in production, eliminating the need to halt the system, i.e., wait for all traffic to stop, replace the production version of the component with an upgraded version, test and finally place the upgraded version into production. For users, this means that down time waiting for the system to come back up can be reduced or even eliminated.

Figure 2B:
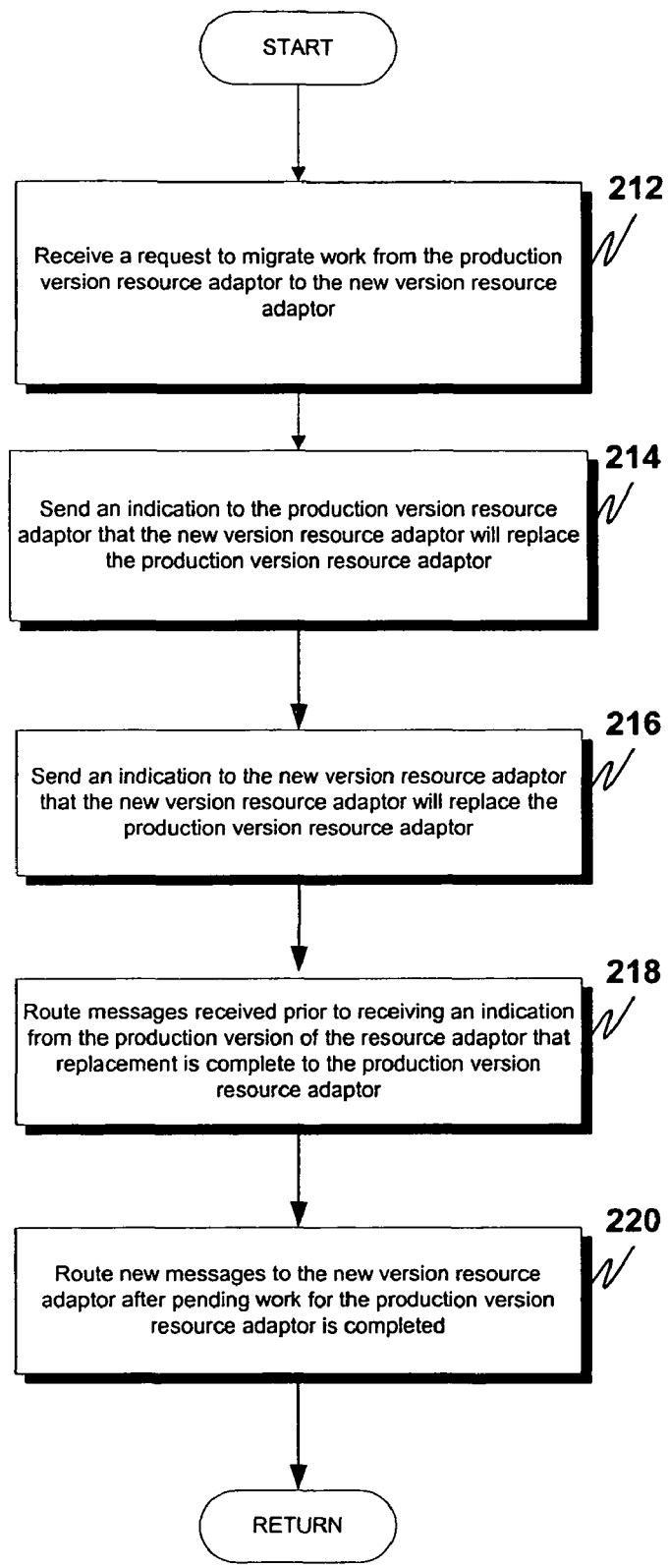
FIG. 2B is an operational flow diagram illustrating a high level overview of a technique for substituting a new version resource adaptor for a production version of the resource adaptor in an embodiment.

FIG. 2B is an operational flow diagram illustrating a high level overview of a technique for substituting a new version resource adaptor for a production version of the resource adaptor in an embodiment. As shown by FIG. 2B, a request to migrate work from the production version resource adaptor to the new version resource adaptor is received (block 212). An indication that the new version resource adaptor will replace the production version resource adaptor is sent to the production version resource adaptor (block 214). An indication that the new version resource adaptor will replace the production version resource adaptor is sent to the new version resource adaptor (block 216). Messages received prior to receiving an indication from the production version of the resource adaptor that replacement is complete are routed to the production version resource adaptor (block 218). New messages are routed to the new version resource adaptor after pending work for the production version resource adaptor is completed (block 220). Transaction flow between the resource adapters, application server and EIS during a process of substituting a new version resource adaptor for a production version of the resource adaptor in an embodiment are illustrated by FIG. 3.

Figure 3:
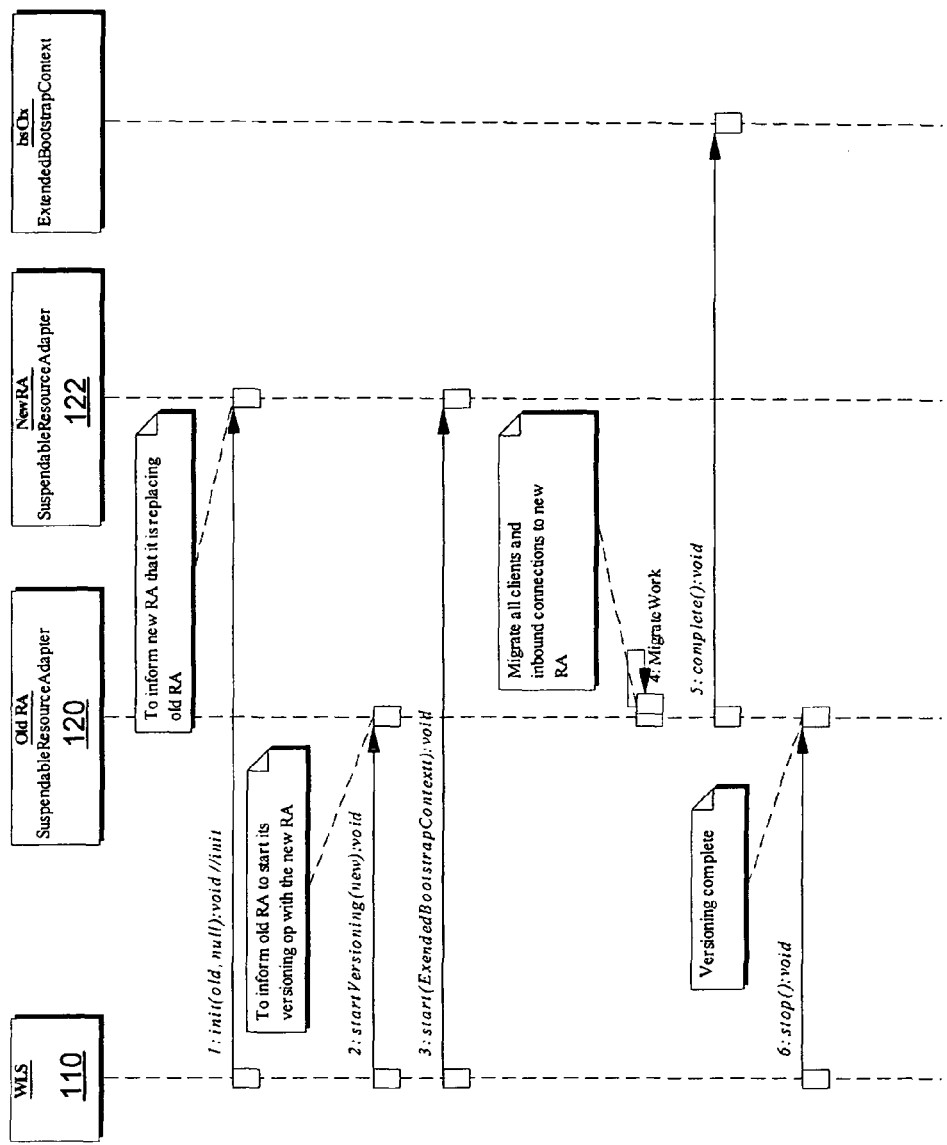
FIG. 3 is a transaction flow diagram illustrating a high level overview of a technique for substituting a new version resource adaptor for a production version of the resource adaptor in an embodiment.

Now with reference to FIG. 3, in an embodiment and by way of example, an application server 110 commences a versioning process by sending an init message (1) to a new resource adapter 122 to inform the new resource adapter that it will be replacing an old resource adapter 120. Next, application server 110 sends a start versioning message (2) to the old resource adapter 12 to inform the old resource adapter 120 to begin versioning operations with new resource adapter 122. The application server 110 next sends a start Extended Context Bootstrap message (3) to the new resource adapter 122 to inform new resource adapter 122 to begin migrating services from the old resource adapter 120 to the new resource adapter 122. Resource adapters 120, 122 migrate all work and inbound transactions (4). When migration is completed, old resource adapter 120 sends a complete message to Extended Context Bootstrap process (5). Application server 110 responds by sending a stop message to old resource adapter 120 to indicate to the old resource adapter 120 to take itself offline.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for substituting a new version resource adaptor for a production version of the resource adaptor as discussed herein.

Figure 4:
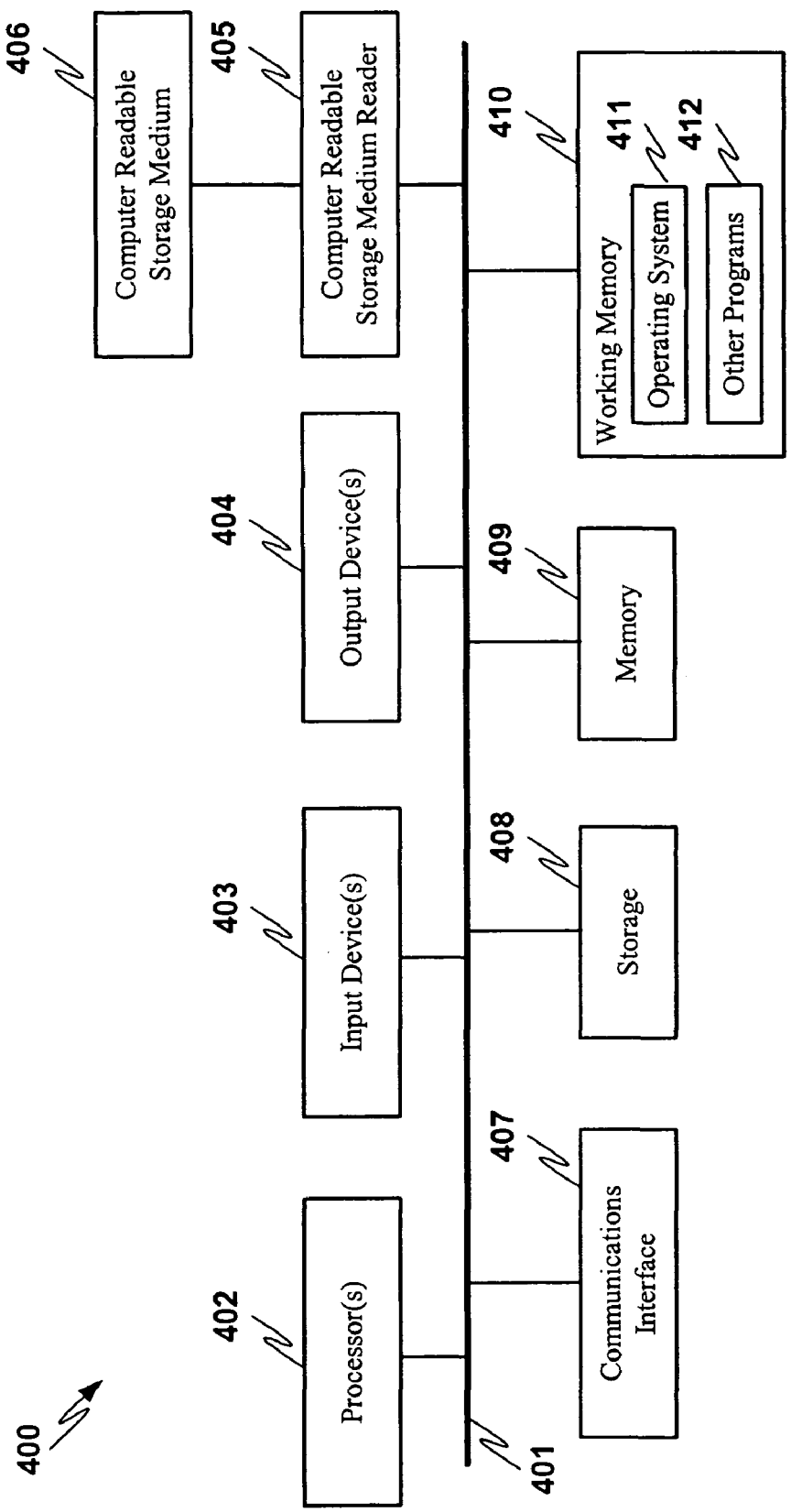
FIG. 4 is a hardware block diagram of an example computer system, which may be used to embody one or more components in an embodiment.

FIG. 4 illustrates an exemplary processing system 400, which can comprise one or more of the elements of FIG. 1. Turning now to FIG. 4, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, MaC™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for substituting a new version resource adaptor for a production version of the resource adaptor, the method comprising:

establishing a connection between a server and an enterprise information system by way of the production version resource adaptor that provides a driver for said connection;

transmitting message traffic from the server to the enterprise information system over the production version resource adaptor;

receiving a request to replace the production version resource adaptor with the new version resource adaptor;

commencing a versioning process by the server by sending an indication from the server to the new version resource adaptor that the new version resource adaptor is to replace the production version resource adaptor in processing the messages from the server;

sending a start versioning message to the production version resource adaptor to inform the production version resource adaptor to begin migrating services from the production version resource adaptor to the new version resource adaptor, wherein after receiving the start versioning message, the production version resource adaptor migrates all clients and inbound transactions to the new version resource adaptor;

receiving an indication from the production version resource adaptor to the server indicating that migration is complete;

directing the message traffic to the new version resource adaptor after the indication is received from the production version resource adaptor to the server indicating that replacement is complete; and sending a stop message from the server to the production version resource adaptor, instructing the production version resource adaptor to take itself offline.

2. The method of claim 1, further comprising: enabling the production version resource adaptor and the new version resource adaptor to perform substitution of the new version resource adaptor for the production version of the resource adaptor independent of processing external to either of the production version resource adaptor and the new version resource adaptor.

3. The method of claim 1, wherein the resource adaptor comprises code that represents an Enterprise Information System (EIS).

4. The method of claim 1, wherein the resource adaptor is compatible with the Java 2 Enterprise Edition (J2EE) Connector Architecture.

5. The method of claim 1, wherein receiving a request to replace a production version resource adaptor with a new version resource adaptor comprises:

receiving a request to migrate work from at least one connection established via the production version resource adaptor to the new version resource adaptor.

6. The method of claim 1, wherein the indication includes a pointer to the new version resource adaptor.

7. The method of claim 1, further comprising:
routing new messages to the new version resource adaptor after pending work for the production version resource adaptor is completed.

8. The method of claim 1, wherein the new version resource adaptor is installed and replaces the production version resource adaptor while simultaneously processing the message traffic being received from the server without stopping said message traffic.

9. A machine-readable storage medium carrying one or more sequences of instructions for substituting a new version resource adaptor for a production version of the resource adaptor, which instructions, when executed by one or more processors, cause the one or more processors to carry out the steps of:
establishing a connection between a server and an enterprise information system by way of the production version resource adaptor that provides a driver for said connection;
transmitting message traffic from the server to the enterprise information system over the production version resource adaptor;
receiving a request to replace the production version resource adaptor with the new version resource adaptor;
commencing a versioninq process by the server by sending an indication from the server to the new version resource adaptor that the new version resource adaptor is to replace the production version resource adaptor in processing the messages from the server;
sending a start versioning message to the production version resource adaptor to inform the production version resource adaptor to begin migrating services from the production version resource adaptor to the new version resource adaptor, wherein after receiving the start versioning message, the production version resource adaptor migrates all clients and inbound transactions to the new version resource adaptor;
receiving an indication from the production version resource adaptor to the server indicating that migration is complete;
directing the message traffic to the new version resource adaptor after the indication is received from the production version resource adaptor to the server indicating that replacement is complete; and
sending a stop message from the server to the production version resource adaptor, instructing the production version resource adaptor to take itself offline.

10. The machine-readable storage medium as recited in claim 9, the execution of the instructions enabling the production version resource adaptor and the new version resource adaptor to perform substitution of the new version resource adaptor for the production version of the resource adaptor independent of processing external to either of the production version resource adaptor and the new version resource adaptor.

11. The machine-readable storage medium as recited in claim 9, wherein the instructions for carrying out the step of receiving a request to replace a production version resource adaptor with a new version resource adaptor include instructions for carrying out the step of:
receiving a request to migrate work from the production version resource adaptor to the new version resource adaptor.

12. The machine-readable storage medium as recited in claim 9, wherein the indication includes a pointer to the new version resource adaptor.

13. The machine-readable storage medium as recited in claim 9, further comprising instructions for carrying out the step of:
routing new messages to the new version resource adaptor after pending work for the production version resource adaptor is completed.

14. The machine-readable storage medium of claim 9, wherein the new version resource adaptor is installed and replaces the production version resource adaptor while simultaneously processing the message traffic being received from the server without stopping said message traffic.

15. An apparatus for substituting a new version resource adaptor for a production version of the resource adaptor, the apparatus comprising:
a processor; and
one or more stored sequences of instructions which, when executed by the processor, cause the processor to carry out the steps of:
establishing a connection between a server and an enterprise information system by way of the production version resource adaptor that provides a driver for said connection;
transmitting message traffic from the server to the enterprise information system over the production version resource adaptor;
receiving a request to replace the production version resource adaptor with the new version resource adaptor;
commencing a versioning process by the server by sending an indication from the server to the new version resource adaptor that the new version resource adaptor is to replace the production version resource adaptor in processing the messages from the server;
sending a start versioninq message to the production version resource adaptor to inform the production version resource adaptor to begin migrating services from the production version resource adaptor to the new version resource adaptor, wherein after receiving the start versioninq message, the production version resource adaptor migrates all clients and inbound transactions to the new version resource adaptor;
receiving an indication from the production version resource adaptor to the server indicating that migration is complete;
directing the message traffic to the new version resource adaptor after the indication is received from the production version resource adaptor to the server indicating that replacement is complete; and
sending a stop message from the server to the production version resource adaptor, instructing the production version resource adaptor to take itself offline.

16. The apparatus of claim 15, wherein the execution of the instructions by the processor enable the production version resource adaptor and the new version resource adaptor to perform substitution of the new version resource adaptor for the production version of the resource adaptor independent of processing external to either of the production version resource adaptor and the new version resource adaptor.

17. The apparatus of claim 15, wherein the new version resource adaptor is installed and replaces the production version resource adaptor while simultaneously processing the message traffic being received from the server without stopping said message traffic.

* * * * *

UNITED STATES PATENT AND TRADEMARK OFFICE
CERTIFICATE OF CORRECTION

| | | |
|---|---|---|
| PATENT NO. | : 7,882,503 B2 | |
| APPLICATION NO. | : 11/282060 | |
| DATED | : February 1, 2011 | |
| INVENTOR(S) | : Gish et al. | |

It is certified that error appears in the above-identified patent and that said Letters Patent is hereby corrected as shown below:

On sheet 4 of 5, in figure 3, line 10, delete "ExendedBootstrapContextt" and insert -- ExtendedBootstrapContext --, therefor.

In column 1, line 25, delete "COMPUTERREADABLE" and insert -- COMPUTER READABLE --, therefor.

In column 7, line 34, delete "MaC™," and insert -- Mac™, --, therefor.

In column 9, line 25, in Claim 9, delete "versioninq" and insert -- versioning --, therefor.

In column 10, line 34, in Claim 15, delete "versioninq" and insert -- versioning --, therefor.

In column 10, line 38-39, in Claim 15, delete "versioninq" and insert -- versioning --, therefor.

Signed and Sealed this
Fourth Day of October, 2011

David J. Kappos
*Director of the United States Patent and Trademark Office*